United States Patent
Jullien-Davin

[15] 3,695,572
[45] Oct. 3, 1972

[54] AUTOMATIC MOLD FOR PARTS OF PLASTIC MATERIAL

[72] Inventor: Jean Jullien-Davin, Valence, France

[73] Assignee: Crouzet, Paris, France

[22] Filed: July 22, 1970

[21] Appl. No.: 57,135

[30] Foreign Application Priority Data

July 29, 1969 France......................6925993

[52] U.S. Cl..............................249/68, 425/DIG. 51
[51] Int. Cl. ..............................................B28b 7/10
[58] Field of Search ..18/2 RS, 2 RP, 2 RM, DIG. 51; 249/68, 105

[56] References Cited

UNITED STATES PATENTS

| | | | |
|---|---|---|---|
| 3,150,222 | 9/1964 | Blaustein et al. | 18/2 RS X |
| 2,330,369 | 9/1943 | Marsh | 18/2 RP UX |
| 2,921,341 | 1/1960 | Hendry | 18/2 RM X |

Primary Examiner—H. A. Kilby, Jr.
Attorney—Holman & Stern

[57] ABSTRACT

A mold for objects of plastic material in which a main injection passage has separate passages extending radially therefrom and which open into the mold cavities, and in which a mechanical element sweeps the space located above the ejectors when the mold is open so that the molded parts which may have remained attached to the ejectors are caused to fall, the said mechanical sweeping element being constituted by the sprue formed by the material which fills the injection and which are formed by the material filling lateral passages located substantially in the joint plane of the mold and provided with radial extensions, while the means for ejecting the sprue are so arranged as to impart a movement of rotation about the axis of the sprue to the assembly which is formed by the sprue and the sprue arms.

3 Claims, 2 Drawing Figures

INVENTOR
Jean Jullien-Davin
By Holman & Stern
ATTORNEYS

AUTOMATIC MOLD FOR PARTS OF PLASTIC MATERIAL

BACKGROUND OF THE INVENTION

This invention relates to automatic molds for plastic fabrication and which comprises extraction means for producing a mechanical discharge of all molded parts formed of plastic materials.

When very light objects of plastic material are intended to be produced by means of an automatic mold, the objects frequently remain attached to the extractors as a result of adhesion. The risk of such an occurrence evidently prevents the use of the mold in fully automatic equipment or at least introduces a potential hazard in the use of such molds.

A number of different means for overcoming this disadvantage are already known. The most common expedient consists in the use of compressed air jets which have the effect of ejecting the finished pieces but this solution suffers from a double disadvantage in that it does not offer complete reliability and requires a substantial consumption of compressed air which rapidly becomes prohibitive in a workshop in which a large number of molding presses are installed, apart from the further drawback due to the level of background noise produced by the large number of intermittent air jets.

Another known means consists in sweeping the space located above the ejectors by means of a mechanical element but this solution calls for a fairly complicated mold construction and slows down the production speed since the mechanical element must be withdrawn after having carried out its function before the mold can be closed again.

In the majority of cases, lightweight parts which require only a small quantity of material are formed in a mold having multiple mold cavities supplied by a main injection passage to which are connected a plurality of lateral or radial passages located in the joint plane of the mold. At the time of molding, the assembly which is formed by the main injection passage and the lateral passages or runners serves to produce a solid commonly referred-to as a "sprue" which usually has to be extracted from the mold before subjecting a further series of parts to the molding process. Extraction of the sprue is usually carried out by means of a ring which is disposed in the axis of the main injection passage and in which is mounted an ejector or so-called sprue-puller, the extremity of which comprises retaining means for maintaining the sprue against the stationary portion of the mold. After opening of the mold, the sprue-puller ejector is in turn thrust forward so that the sprue can fall freely at the moment when the retaining means pass out of the ring.

The object of this invention is to provide improvements for automatic molds and especially for mold ejection systems in order that the space located above the ejectors should be swept mechanically and permit a downward discharge of lightweight parts which may have remained attached to the ejectors, with a mold of this type being characterized in that the mechanical sweeping element is constituted by the sprue per se to which the lateral arms are attached, the arms being provided with radial extensions for sweeping the entire surface which is occupied by the parts to be detached.

SUMMARY OF THE INVENTION

In accordance with the invention, the lateral arms of the sprue are brought, at the time of opening of the mold, in a plane located above the top plane of the ejectors by virtue of the fact that the ejector which is provided for the sprue per se is of greater length than the molded-part ejectors, that the ejector is mounted with a predetermined axial clearance within the ejector-carrier plate of the mold and that the lower extremity of the ejector projects to a slight extent beneath the ejector push-plate by a distance which is equal to the axial clearance resulting from the difference between the height of an annular flange forming part of the ejector and the depth of a cavity which is formed in the ejector push-plate and in which the annular flange is housed.

Means are also provided so that the lateral arms of the sprue should be brought without rotational movement in a plane located above the projecting portions of the mold. Such means consist in slidably mounting the sprue extraction ring, with the amplitude of sliding movement being defined by the difference between the height of an annular flange of the sprue extraction ring and the depth of a cavity which is concentric with the ring, and a key which is parallel to the axis being adapted to cooperate with a slot of the annular flange to prevent rotation of the ring.

Means are further provided so that the sprue should carry out a sufficient movement of rotation at the end of the sprue-extraction operation to ensure that each location in which a molded part is liable to remain attached to the ejectors is swept by at least one of the lateral arms of the sprue. The means consist in providing the sprue extraction ring with a reversible screw-thread having a number of threads in order that, under the action of its ejector, the sprue can be separated from the ring only while carrying out a movement of rotation.

A better understanding of the invention will be gained from the following detailed description in connection with one exemplified embodiment which is illustrated diagrammatically in the accompanying drawings, wherein:

DETAILED DESCRIPTION OF THE DRAWINGS

Figure 1:
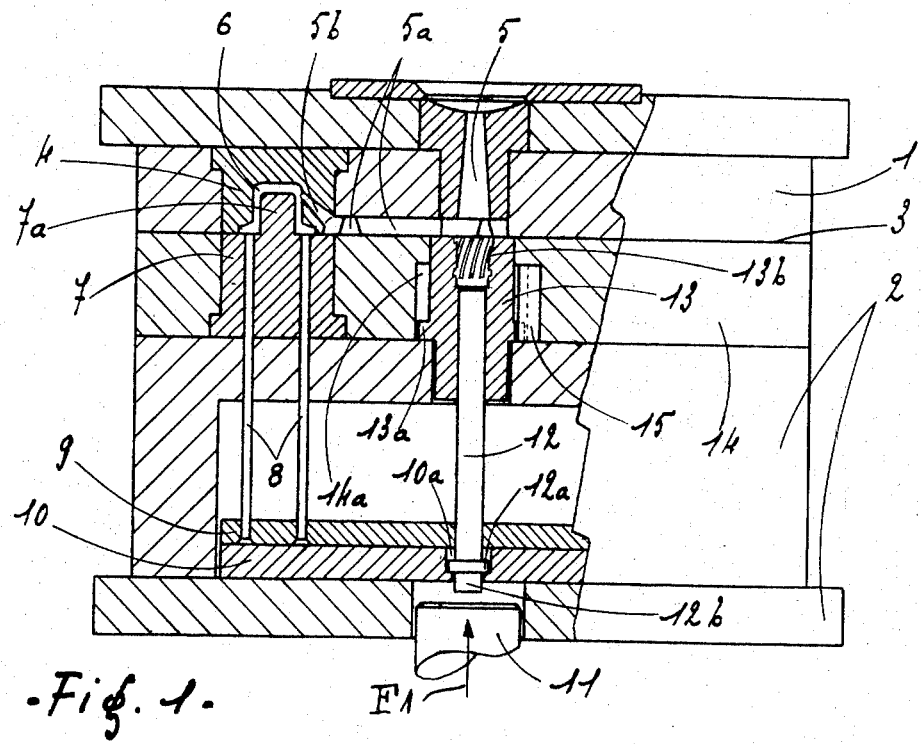
FIG. 1 is a view taken along line I—I of FIG. 2, the view looking in the direction of the arrows and showing a mold which is in the closed position and to which the invention applies.

The mold which is shown by way of example in the closed position in FIG. 1 comprises a movable portion 1 and a stationary portion 2, with the portions being in contact with each other along a joint plane 3.

Provision is made within the movable portion 1 for elements 4 which define mold cavities 6 for the parts to be molded, a conical injection passage 5 which branches into a plurality of lateral passages or runners 5a located substantially in the joint plane 3, with the extremities of the runners being formed by conical passages 5b which open into the mold cavities 6.

Provision is made within the stationary portion 2 for elements 7 provided with projecting portions 7a which are located above the joint plane 3 and constitute the complementary portions or cores of the mold cavities 6 ejectors are fixed on an ejector-carrier plate 9; finally, and an ejector push-plate 10 positioned below the plate 9 serves transmitting to the ejectors 8 the thrust of a ram 11 which constitutes part of the press, with the thrust being applied in the direction of arrow $F_1$.

At the time of the molding operation, the injection passage 5 and the lateral runners 5a permit the formation of a solid body comprising a sprue 5' and lateral arms 5'a which terminate in noses 5'b. Provision is also made for a sprue-ejector 12 which is located in the stationary portion 2 of the mold.

All of the elements 1 to 12 are well known and are given only by way of reminder in order to define the known state of the art and to bring out the original features of the invention.

In accordance with this invention, the sprue-ejector 12 is slidably mounted in the ejector carrier plate 9 and is provided with an annular flange 12a housed within a cavity 10a of the ejector push-plate 10, with the depth of the cavity 10a being greater than the height of the annular flange 12a so that the ejector 12 is mounted with a predetermined freedom of axial movement. As a consequence, an extremity 12b of the ejector 12 projects beyond the push-plate 10 at the moment of injection. At the time of ejection, the ram 11 therefore comes into contact with the ejector 12 before coming into contact with the plate 10, with the result that lateral arms 5'a will necessarily be brought in a plane which is different from the plane containing the extremities of the ejectors 8 and will be permitted to rotate while remaining in their plane without engaging with the ejectors 8.

It will be noted that, if the complementary mold cavity elements 7 comprise hollow portions and if the extremities of the ejectors 8 are level with the bottom of the hollow portions (that is to say are not level with the joint plane 3), the sprue-ejector 12 can be mounted in a conventional ejector.

Figure 2:
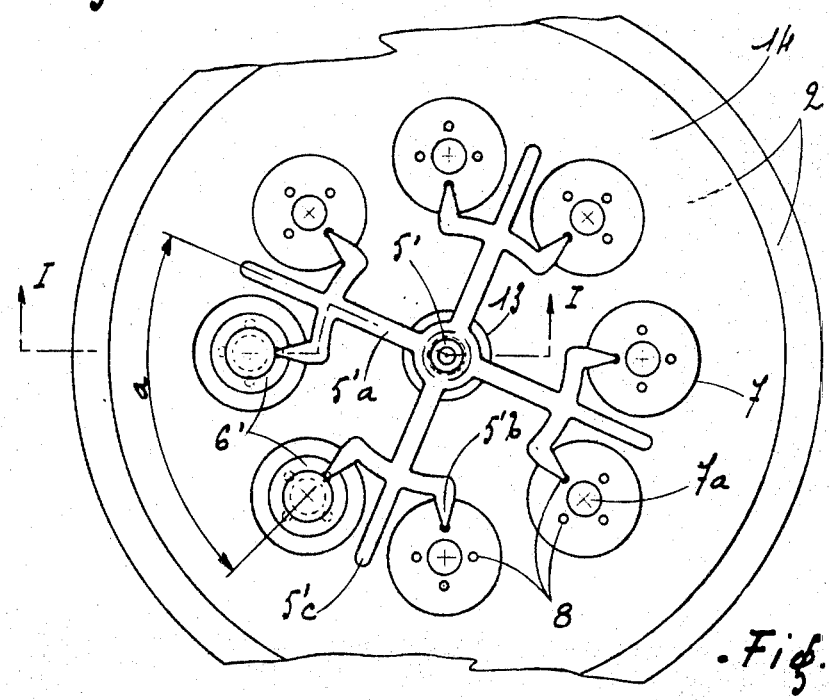
FIG. 2 is a plan view of the stationary portion of the mold together with the sprue and lateral sprue arms in the position which is taken up by the latter before they have undergone a movement of rotation.

In accordance with a second aspect of the invention, the lateral arms 5'a of the sprue 5' are provided with radial extensions 5'c (as shown in FIG. 2), so that the length of each arm from the sprue 5' to the tip of the extension is thus at least equal to the distance between the sprue and the ejectors 8. Hence, as a result of rotational movement about the axis of the sprue, the arm extensions must necessarily cause the detachment and downward discharge of any molded parts 6' (shown in FIG. 2) which may have remained attached to the ejectors.

In accordance with a third aspect of the invention, the sprue is extracted and ejected from the mold while rotating about its axis by control means consisting of a sprue-pulley ring 13 slidably mounted in a plate 14 which is contiguous to the joint plane 3 and forms part of the stationary portion of the mold, the ring 13 being provided with an annular flange 13a which is housed within a cavity 14a of the plate 14.

The amplitude of sliding movement defined by the difference between the thickness of the annular flange 13a and the depth of the cavity 14a is sufficient to displace the lateral arms 5'a — 5'c of the sprue 5' to a distance from the joint plane 3 which is at least equal to the sum of the height of the projecting elements 7a of the mold cavities and of the axial clearance of the ejector 12 (which may be provided if the first characteristic feature of the invention is employed).

A longitudinal key 15 which is fitted within the cavity 14a and cooperates with a slot formed in the annular flange 13a serves to prevent rotational movement of the ring 13.

An anchoring or connection between the sprue and the ring 13 is obtained by means of an internally threaded bore 13b having a plurality of threads which are inclined at a small angle with respect to the generator lines in order that the threaded portion should not be irreversible, with the bottom of the internally threaded bore being closed by the extremity of the ejector 12.

The operation of the different elements hereinabove described is as follows:

In the initial portion of the opening travel of the mold which corresponds to the permissible range of sliding movement of the ring 13, the sprue 5' and the ring 13 follow the movable portion 1 of the mold while the molded parts 6' which have been formed within the mold cavity 6 remain in position, with the effect thereby produced being to shear the capillary peduncle which connects each nose 5'b to the corresponding molded part 6'.

In the second portion of the opening travel of the mold, the sprue 5' which is retained by the ring 13 and has reached the end of its travel is broken away from the movable portion as well as the points 5'b which have been formed within the passages or runners 5b.

When the ram 11 comes into action in order to displace the ejectors, an initial portion of the travel of the elements 8-9-10 is employed in the usual manner for the purpose of ejecting the molded parts 6' while the ejector 12 is brought into contact with the sprue 5'.

In the final stage of operation, the means which form the basis of the type provided by this invention have the effect of causing the ejector 12 to drive the sprue out of the ring 13. By virtue of the threaded portion 13b, the sprue 5' can pass out of the ring only by rotating the arms 5'c which then pass above the ejectors 8 and the molded parts 6' are necessarily detached by the arms if they have remained attached to the ejectors.

In the case of a mold having eight mold cavities of the type shown in FIG. 2, a rotation through an angle $a$ which is equal to three-sixteenths of a revolution is sufficient to ensure release of all the molded parts 6'.

I claim:

1. In a mold for molding plastic objects, a pair of relatively movable mold portions engageable along a joint plane and when engaged along the joint plane being cooperable to provide molding cavities, a main ejection passage in one of the mold portions, separate lateral passages located in the joint plane extending radially from the main passage and communicating with the molding cavities, the molding cavities being offset from the main injection passage, an ejector provided in the other mold portion cooperable with a molding cavity to eject the molded object therefrom when the mold portions are disengaged along the joint plane, each of said lateral passages having an extension projecting outwardly radially beyond a circle on which the ejectors are located, and a helical cavity coaxial with the main injection passage, the helical cavity bounded by surface means for imparting a rotational movement to hardened molded material in the main injection passage around its own axis upon disengagement of the mold portions, so as to cause the rotation of hardened molded material present in the lateral passages and extensions thereof which material is integral with the hardened molded material in the main injection passage the rotation causing the hardened molded material in the lateral passages and extensions thereof to sweep the space above the joint plane and dislodge any molded parts remaining attached to the ejectors.

2. The mold for molding plastic objects as claimed in claim 1 in which one of said mold portions is stationary, said rotation imparting surface means including a sprue puller ring slidable to a limited extent within the stationary portion to allow the material in the lateral passages to come to a plane located above the stationary portion, a longitudinal key cooperable with the ring and stationary portion to prevent rotational movement of the ring, and a further ejector for separating the sprue in the main injection passage from the ring, said ring having internally a threaded portion with a reversible helical screw thread so that the ejection of the sprue under the thrust exerted by the further ejector imparts rotational movement to the sprue about its axis.

3. The mold for molding plastic objects as claimed in claim 2 in which the stationary mold portion is provided with an ejector carrier plate, an ejector push plate cooperable with the carrier plate, the ejectors for the molded objects being carried by the carrier plate, the ejectors each having an end level with the joint plane, the further ejector being slidably mounted in the carrier plate, an annular flange on the further ejector located with axial play within a cavity provided in the push plate, the end of the further ejector projecting beyond the face of the push plate to enable an operating member associated with a press to be applied against the push plate so that the further ejector and hence the sprue are moved a distance equal to the extent of the projection and the axial play of the further ejector.

* * * * *